United States Patent Office 2,918,409
Patented Dec. 22, 1959

2,918,409

HYPOCHROMIC ANEMIA FACTOR AND PROCESS OF PRODUCING SAME

Daniel L. Horrigan, Cleveland Heights, Ohio, assignor to Western Reserve University, Cleveland, Ohio No Drawing. Application June 6, 1957
Serial No. 663,904

3 Claims. (Cl. 167—74.6)

This invention relates to a liver extract derivative which is active against hypochromic anemia.

Hypochromic anemia is characterized by low hemoglobin concentration, erythroid hyperplasia of the bone marrow with erythroblastic maturation arrest, erythrocytic anisocytosis, poikilocytosis, anisochromia, and a lack of a feeling of well-being in the patient. Hypachromic anemia is refractory to treatment with substances, such as iron, vitamin $B_{12}$, folacin and leucovorin, which are known to be effective in the treatment of other types of anemia.

According to the present invention it has been found that a substance derived from liver extract is an active antihypochromic anemia agent. This substance will be referred to herein as the hypochromic anemia factor. Administration of the hypochromic anemia factor to a patient afflicted with hypochromic anemia results in clinical response including rapid hemoglobin regeneration, prompt reticulocyte response, correction of the erythrocytic morphologic abnormalities and increased feeling of well-being.

The hypochromic anemia factor isolated according to the present invention contains all of the anti-hypochromic anemia activity of the liver extract from which it is derived. One important advantage of the hypochromic anemia factor compared to crude liver extract is its much higher potency. A further advantage of the hypochromic anemia factor is that it can be administered in pleasant forms, such as tablets, elixirs, and other known pharmaceutical formulations, while liver extract is administered as a liquid with a disagreeable taste. Still another advantage of the hypochromic anemia factor is that allergic manifestations are rare, while allergy to liver extract is not uncommon.

The hypochromic anemia factor is obtained from crude liver extract, such as liquid extract of liver, U.S.P. (Valentine), obtainable from the Valentine Co., Richmond, Virginia. The following example is illustrative of the means by which the hypochromic anemia factor may be obtained.

EXAMPLE I

*a. Extraction of crude fraction from liver extract*

One hundred and eighty ml. of liquid extract of liver (Valentine) is thoroughly mixed with 420 ml. of 95% ethanol. The mixture is allowed to settle for a few minutes, then the cloudy supernatant liquid is decanted. The residue is discarded. For clarification the supernatant liquid is allowed to stand overnight. The clear liquid is then decanted. The alcohol is evaporated in vacuo at a temperature not exceeding 50° C. Distilled water is then added to adjust the volume of the alcohol-free residue to 100 ml., and 1.0 ml. of 1 N hydrochloric acid is added. The aqueous medium is extracted three times with two volumes of ethyl acetate. The aqueous phase is discarded and the organic phase is clarified by allowing to stand in the cold. After clarification, the ethyl acetate extract is decanted and evaporated to dryness in vacuo at 40° to 50° C. The residue is resuspended in about 200 ml. of water, and concentrated (29%) ammonium hydroxide is added dropwise until solution occurs.

*b. Ion exchange treatment of impure liver extract fraction*

A column of "Dowex–1" resin, 200–400 mesh, 4% cross linkage, chloride form, 300 mm. high, is set up in a glass tube 27 mm. in diameter. This column is rubber stoppered and connected by rubber tubing to a one-liter aspirator bottle which serves as a reservoir. The resin is washed with a solution containing equal volumes of 95% ethanol and 1 N aqueous hydrochloric acid until the spectrophotometeric reading of the effluent at 275 $m\mu$, as measured by a Beckman Model DU spectrophotometer, is virtually zero. The resin column is then washed free of alcohol and to neutrality with distilled water.

The aqueous ammonium hydroxide solution of the impure hypochromic anemia factor, obtained as described in part *a* of this example, is passed through the resin column. The column is then washed with about one liter of water, followed by 0.01 N hydrochloric acid. The dilute hydrochloric acid wash is continued until a prominent yellow band begins to appear in the effluent, requiring about one liter. The resin is then washed with about two to three liters of a solution consisting of one part 1 N hydrochloric acid, 89 parts water, and 10 parts ethanol, until a spectrophotometric reading less than 0.1 is obtained. The last band eluted with this wash has a peak optical density of about 0.6 with a maximum at 290 $m\mu$. The resin is then washed with a solution containing one part 1 N hydrochloric acid, 49 parts water, and 50 parts ethanol. The flow rate is adjusted to about 20 to 30 ml. per hour, and the effluent is collected fractionally in cuts of 10 to 15 ml. Each cut is read spectrophotomerically at 275 $m\mu$. The first 800 to 1000 ml. of effluent with this wash contains three major fractions with ultraviolet absorption at 275 $m\mu$. The peak optical densities of these fractions are greater than 2, about 1.5, and about 0.8 respectively. These fractions are discarded. When the optical density readings reach 0.4 to 0.5, the composition of the eluant is changed to a solution containing 5 parts 1 N hydrochloric acid, 45 parts water, and 50 parts ethanol. The effluent is collected fractionally in cuts of 10 to 15 ml. until the optical density is constant at about 0.2 to 0.3. These effluent fractions are pooled to obtain a single eluate containing the hypochromic anemia factor and having an optical density in the range of about 0.2 to about 0.6.

*c. Paper chromatography of resin eluate*

The pooled ion exchange resin eluate from part *b* is evaporated in vacuo until all of the ethanol is distilled off. The residue is extracted twice with ethyl acetate, first with two volumes and then with one volume. The extract is clarified in the cold, the ethyl acetate evaporated off in vacuo and the residue dissolved in 2.0 ml. of ethanol. This solution is stripped in 0.5-ml. portions on a 10-inch line 3 cm. from the bottom of a sheet of Whatman No. 1 filter paper 18¼ x 17½", which has been previously washed in distilled water. The sheets are then formed into cylindrical shape by stapling the vertical sides together, and suspended in covered cylindrical jars 10" in outside diameter and 18" high, containing 400 ml. of 25% aqueous propanol. The sheets are developed by ascending chromatography for four hours, removed, and air dried. The sheets are then examined in ultra-violet light, revealing a brilliant fluorescent band, $R_f$=0.75 to 0.80. The entire area of the sheet between the band and the solvent front, but excluding the band, is eluted with water and the eluate from the four columns combined.

d. Recycling of paper strip eluate

The combined eluate obtained in part c of this example is adsorbed on a column of "Dowex-1" resin, 200–400 mesh, 4% cross linkage, chloride form, 300 mm. high and 27 mm. in diameter. The column is eluated with a solution containing one part 1 N hydrochloric acid, 49 parts water, and 50 parts ethanol. The eluate is collected in 10–15 ml. fractions which are read spectrophotometrically. The first band, which is dark yellow with appreciable optical density at 275 m$\mu$ is discarded. Elution is continued, and about 200 ml. of eluate having low optical density is obtained and discarded. At this point, the absorption at 275 m$\mu$ rises, and about 500 ml. of eluate having appreciable absorption at 275 m$\mu$ is obtained before the effluent having appreciable optical density is pooled, evaporated and extracted with ethyl acetate, which is removed by evaporation, and the residue is dissolved in 2 ml. of ethanol and chromatographed as described in part c of this example. The volume of the ethanol solution is adjusted prior to chromatography so that 2 ml. contains hypochromic anemia factor equivalent to that derived from one column of resin. Examination of the paper chromatograms in ultra-violet light reveals a substance having $R_f=0.85$, which is fluorescent when the paper is wet and absorbing upon drying. Elution with water yields the purified hypochromic anemia factor; $\lambda_{max}.$ 280 m$\mu$, shoulder at 285 to 290 m$\mu$, $E_{235m\mu}/E_{280m\mu}=0.75$, $E_{245m\mu}/E_{280m\mu}=0.45$ to 0.5.

While the foregoing example illustrates one procedure by which purified hypochromic anemia factor can be obtained, it is understood that considerable variation can be made without departing from this invention. For example, the hypochromic anemia factor can be obtained simply by extracting liver extract with ethyl acetate and chromatographing on an anion exchange resin. Another modification is to omit the recycling procedure described in part d of the above example, recovering the eluate from the paper strips as the final product. This can be done without serious impairment of the purity or potency of the product. Still other modifications of the procedure described in the foregoing example can be made as desired.

Any strongly basic anion exchange resin can be used in place of "Dowex-1." Particularly desirable anion exchange resins are polystyrene resins cross-linked with divinyl benzene having quaternary ammonium basic groups of which "Dowex-1" is one example.

The hypochromic anemia factor obtained according to the present invention is active in preventing hypochromic anemia when administered orally. The optimum dosage is about 25 units (about one milligram) per day orally. The number of units, which is the measure of therapeutic activity, is obtained by multiplying the optical density to ultra-violet light of 280 m$\mu$ wavelength measured at a pH of 5.5 by the volume of solution in milliliters. One milligram of hypochromic anemia factor contains approximately 25 to 30 units. Activity against hypochromic anemia is observed in oral dosages as little as 0.25 mg. per day. Daily dosages larger than 1 mg., up to about 2 mg., for example, may be administered, although no increased effect is observed on increasing the dosage above 1 mg. per day.

The hypochromic anemia factor may be prepared in any conventional form for oral administration. For example, the hypochromic anemia factor may be incorporated into capsules, or combined with the usual tablet-making excipients and formed into tablets. Elixirs of the hypochromic anemia factor can also be prepared.

While this invention has been described in detail with respect to specific embodiments thereof, it is understood that the scope of this invention is measured by the scope of the appended claims.

What is claimed is:

1. A process for recovering an anti-hypochromic anemia substance from crude liver extract which comprises extracting the liver extract with a lower aliphatic alcohol, concentrating and recovering a crude anti-hypochromic anemia fraction from the alcohol, adding dilute aqueous mineral acid to said fraction, extracting said fraction with ethyl acetate, evaporating the ethyl acetate, dissolving the residue in aqueous ammonium hydroxide, adsorbing the dissolved material on an anion exchange resin, eluting the material with an acidified aqueous alcohol, collecting a fraction having an optical density in the range of about 0.2 to about 0.5, removing the alcohol from said fraction, extracting the residue with ethyl acetate, removing the ethyl acetate, dissolving the residue in a lower aliphatic alcohol, chromatographing the alcoholic solution, developing the chromatogram with an aqueous lower aliphatic alcohol, eluting with a weakly acidic aqueous alcoholic solution, and collecting an eluate fraction having appreciable optical density to ultra-violet light.

2. A process for recovering an anti-hypochromic anemia substance from crude liver extract which comprises extracting the liver extract with ethanol, evaporating the ethanol, acidifying the residue with a dilute aqueous solution of a mineral acid, extracting the acidified residue with approximately six volumes of ethyl acetate, evaporating the ethyl acetate, dissolving the residue in concentrated aqueous ammonium hydroxide, adsorbing the dissolved material on an anion exchange resin initially in the salt form, eluting the column with dilute aqueous hydrochloric acid, followed by mixtures of dilute aqueous hydrochloric acid with ethanol, collecting an eluate fraction having an optical density of approximately 0.2 to 0.5, removing the ethanol in vacuo from said fraction, extracting the residue with ethyl acetate, evaporating the ethyl acetate, dissolving the residue in ethanol, chromatographing the ethanol solution of residue thus obtained, eluting said chromatogram with water, absorbing the eluate on an anion exchange resin, initially in the chloride form, eluting the ion exchange resin with a mixture of dilute aqueous hydrochloric acid and ethanol and collecting a fraction having appreciable optical density to ultra-violet light in $\lambda_{max}.=280$ m$\mu$ and $R_f=0.85$.

3. An anti-hypochromic anemia-active substance obtained by extracting crude liver extract with a lower aliphatic alcohol, concentrating and recovering a crude anti-hypochromic anemia fraction from the alcohol, adding dilute aqueous mineral acid to said fraction, extracting said fraction with ethyl acetate, evaporating the ethyl acetate, dissolving the residue in aqueous ammonium hydroxide, adsorbing the dissolved material on an anion exchange resin, eluting the material with an acidified aqueous alcohol, collecting a fraction having an optical density in the range of about 0.2 to about 0.5, removing the alcohol from said fraction, extracting the residue with ethyl acetate, removing the ethyl acetate, dissolving the residue in a lower aliphatic alcohol, chromatographing the alcoholic solution, developing the chromatogram with an aqueous lower aliphatic alcohol, eluting with a weakly acidic aqueous alcoholic solution, and collecting an eluate fraction having appreciable optical density to ulta-violet light.

References Cited in the file of this patent

UNITED STATES PATENTS

| | | |
|---|---|---|
| 2,628,186 | Shive | Feb. 10, 1953 |
| 2,684,322 | Colovos | July 20, 1954 |
| 2,702,263 | Shafer | Feb. 15, 1955 |
| 2,739,100 | McCormick | Mar. 20, 1956 |

OTHER REFERENCES

Masuya: Chem. Abst., vol. 48, 1954, p. 207 (d).
Youe: Chem. Abst., vol. 49, 1955, p. 6400 (f).